United States Patent [19]
Kao et al.

[11] Patent Number: 5,317,638
[45] Date of Patent: May 31, 1994

[54] PERFORMANCE ENHANCEMENT FOR ANSI X3.92 DATA ENCRYPTION ALGORITHM STANDARD

[75] Inventors: Chang Y. Kao, Endwell, N.Y.; James P. Kuruts, Forest City, Pa.; Sivarama K. Kodukula, Vestal, N.Y.

[73] Assignee: International Business Machines Corporation, Armonk, N.Y.

[21] Appl. No.: 916,777

[22] Filed: Jul. 17, 1992

[51] Int. Cl.$^5$ .............................................. H04K 1/00
[52] U.S. Cl. ......................................... 380/29; 380/28
[58] Field of Search ............................. 380/21, 29, 28

[56] References Cited

U.S. PATENT DOCUMENTS

| | | | |
|---|---|---|---|
| 3,958,081 | 5/1976 | Ehrsam et al. | 178/22 |
| 3,962,539 | 6/1976 | Ehrsam et al. | 178/22 |
| 4,612,413 | 9/1986 | Robert et al. | 178/22.08 |
| 4,805,216 | 2/1989 | Greenberg | 380/21 |
| 4,888,800 | 12/1989 | Marshall et al. | 380/21 |
| 4,926,478 | 5/1990 | Greenberg | 380/21 |
| 4,941,176 | 7/1990 | Matyas et al. | 380/21 |
| 5,003,597 | 3/1991 | Merkle | 380/37 |
| 5,008,935 | 4/1991 | Roberts | 380/29 |
| 5,081,678 | 1/1992 | Kaufman et al. | 380/21 |

OTHER PUBLICATIONS

IBM TDB vol. 34 No. 12 May 1992 pp. 335–338 "Strong Cryptographic Coupling the Leftmost and Rightmost 64 Bits of Cryptographic Key".

*Primary Examiner*—David C. Cain
*Attorney, Agent, or Firm*—Lynn L. Augspurger; Michael E. Belk

[57] ABSTRACT

ANSI X3.92 Data Encryption algorithm is public knowledge, and is widely used where data security and integrity is vital, such as commercial banks, secret service organizations etc. Even though this algorithm is feasible to implement in software, it is impractical to achieve desired performance for most of the applications. Hence, a hardware solution is highly recommended. Prior art DES hardware in CMOS technology served performance needs of low-end and mid-range systems only, due to the technology constraints. However, some of these constraints are removed through the technology breakthroughs and the current CMOS is well suited for high performance applications. While prior art DES designs allowed one round per cycle to minimize the cell count, the current technology allows of multiple rounds per cycle due to the denser CMOS chip technology. In order to maximize the number of rounds for a given cycle time, careful study of algorithm to determine the critical paths from a logic implementation perspective is required. This invention identifies one such path in f-function of the DES algorithm, where the expanded data and the key is XOR'd prior to entering S-function. It is mathematically proven that if the left half of the input data is expanded and XOR'ed with the second key at the same time the right half of the input data which is still going through its XOR, S-function, permute and expansion, then this expanded result can be immediately XOR'ed with the left input data being expanded and XOR'ed in parallel. The resulting output can be used as input to the next S-function, thus eliminating a stage of expansion and XOR logic for all subsequent S-function inputs in rounds 2 through 15.

6 Claims, 5 Drawing Sheets

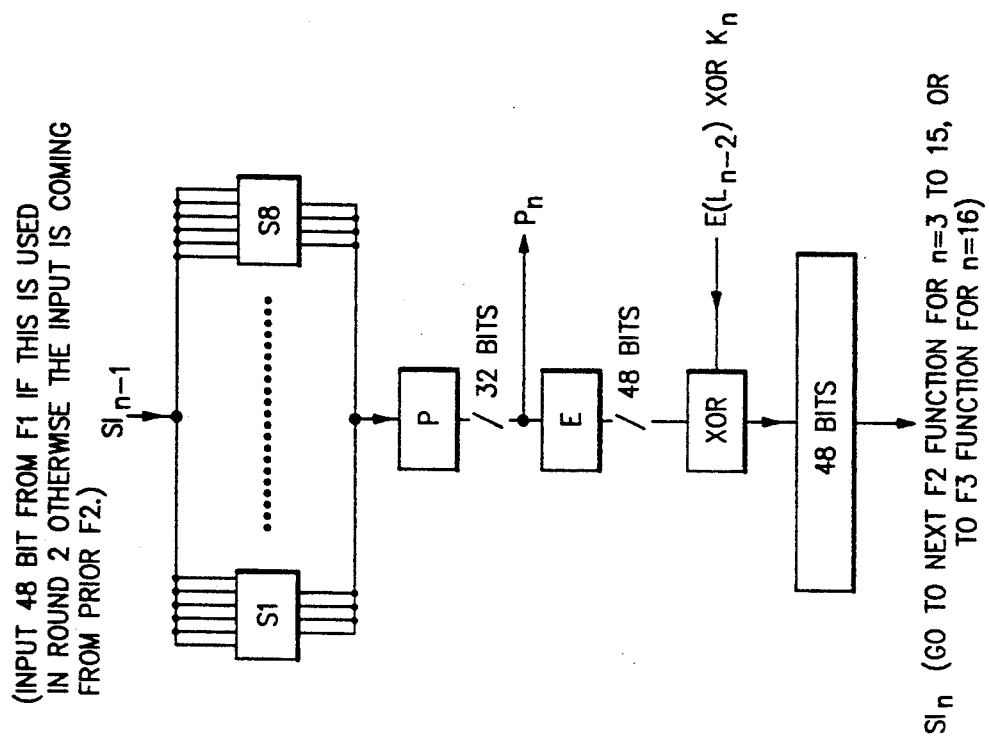

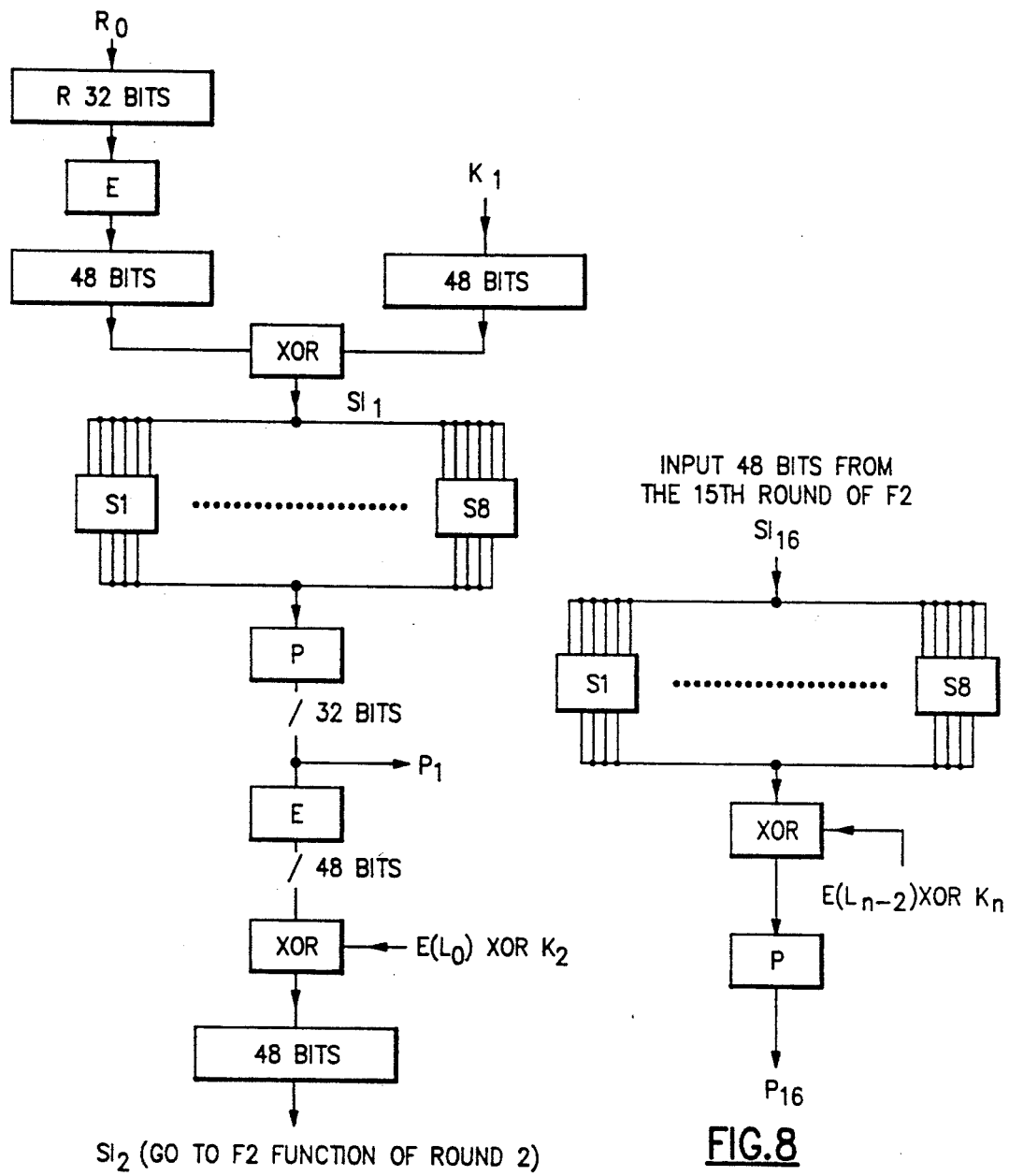

PERFORMANCE ENHANCEMENT FOR ANSI X3.92 DATA ENCRYPTION ALGORITHM STANDARD

FIELD OF THE INVENTION

This invention relates to computer systems and particularly to Cryptographic processors, where DES algorithm is used for the data encryption as a standard.

GLOSSARY OF TERMS

| | |
|---|---|
| DES | Data Encryption Standard - An algorithm for encryption/decryption of data using a key |
| E0 | 32 bit to 48 bit Expansion according to a set pattern |
| $R_n$ | Right side 32 bits of input data of Round n |
| $K_n$ | 48 bit Key |
| $L_n$ | left side 32 bits of input data of Round n |
| $SI_n$ | 48 bits of input data to S-BOX of Round n |
| n | the current round of operation |

REFERENCES USED IN THE DISCUSSION OF THE INVENTION

During the detailed description which follows the following works will be referenced as an aid for the reader. These additional references are:

1. Key_Controlled Cryptographic Algorithm, Implementation of Cryptography, IBM Corporate standard specification, C-S 0-3031-001, 1989-03
2. Key_Controlled Cryptographic Algorithm Description, IBM Corporate specification, C-H-0-3031-002, C-S 0-3031-001
3. Data Encryption Standard ANSIX3.92.

These additional references are incorporated by reference.

BACKGROUND OF THE INVENTION

The Data Encryption Algorithm (DEA) is a complete description of a mathematical algorithm for encryption (encipher) and decryption (decipher) of binary coded data. Encryption converts plain text to unintelligible form and decryption converts ciphered text back to plain text. The DEA specifies both encryptions and decryption operations under a key. Plain text can be recovered for a given ciphered text, by using the same key that was used for encryption. As this algorithm is public knowledge, the security is achieved solely from the key protection.

The DEA standard has been developing for many years and International Business Machines Corporation has used a Cryptographic Algorithm defined by 1. Key_Controlled Cryptographic Algorithm, Implementation of Cryptography, IBM Corporate standard specification, C-S 0-3031-001, 1989-03; and 2. Key_Controlled Cryptographic Algorithm Description, IBM Corporate specification, C-H-0-3031-002, C-S 0-3031-001 since 1989 and 1990. These documents show how to implement and follow the standard which we have found needs improvement.

It will be noted that sometimes encryption and decryption are distinguished, but as the invention here works for both, the term encryption is used as the generic term.

SUMMARY OF THE INVENTION

The improvements in the implementation of the standard achieve faster execution of the DES algorithm in a given cycle time, which in turn results increase in system performance. (e.g. more security transactions/sec) These improvements are accomplished by: a) Identifying the critical path by analyzing the algorithm; and b) Removing and rearranging the logic without altering the algorithm.

These and other improvements are set forth in the following detailed description. For a better understanding of the invention with advantages and features, refer to the description and to the drawings.

BRIEF DESCRIPTION OF THE DRAWINGS

FIG. 4 show the Permutation function (P) for permuting the S-function output.

FIG. 5 shows restructured DES design, by removing the XOR function from the critical path for the rounds 2 through 15.

FIG. 6 illustrates the f1 Function which relates to our invention. FIG. 6 shows the details of the "f1" function used in the first round of the DES logic.

FIG. 7 illustrates the f2 Function which relates to our invention. FIG. 7 shows the details of the "f2" function used in rounds two through fifteen of the DES logic.

FIG. 8 illustrates the f3 Function which relates to our invention. FIG. 8 shows the details of the "f3" function used only in the last round of the DES logic, round sixteen.

Our detailed description explains the preferred embodiments of our invention, together with advantages and features, by way of example with reference to the following drawings.

DETAILED DESCRIPTION OF THE INVENTION

While the prior art documents which have been referenced above do perform data encryption, they need to be improved in order to enhance performance in speed of encryption. We have developed a new DES design which does improve the speed of encryption and decryption.

The Preferred Embodiment

We have developed our new design after discovering that certain logical functions can be restructured without altering the DES algorithm for achieving better performance. Our development which we will describe in detail achieves these changes and proves these changes in no way alter the algorithm.

Figure 1:
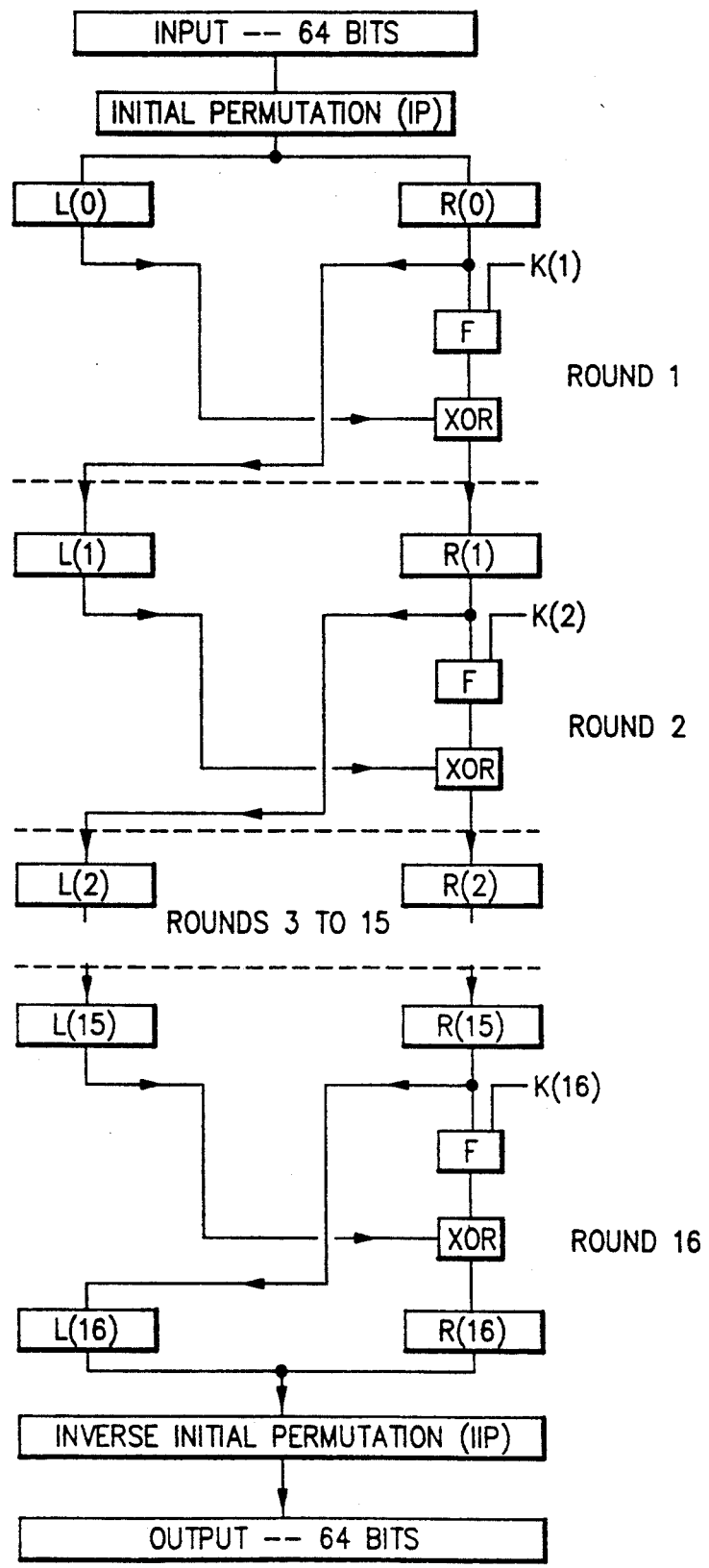
FIG. 1 shows schematically an overview of the standard DES algorithm.

FIG. 1 on illustrates the standard implementation of DES algorithm and the following paragraphs describe this algorithm briefly, to help the invention understand and see the differences. For a detailed description of this algorithm, it is recommended to refer to the IBM Corporate specification of the Key-controlled Cryptographic algorithm, Document #C-HO-3031-002, 1990-11, written in accordance to the aforementioned standard. DES algorithm consists of a 64-bit initial permutation, 16 "rounds" of data involution, and finally, a 64-bit inverse initial permutation. Logical time delay caused by the permutations is minimal, while the 16 back to back "rounds" of data involution are relatively time consuming.

In each round, right half of data is input into a function f, and the left half undergoes a bit by bit exclusive or (XOR) with the output of function f. In rounds 1 to 16 the other input of function f is a 48 bit partial key, which is generated from the 64 bit key. Outputs L(16) and R(16) are concatenated and subjected to inverse initial permutation for final DES 64 bit output.

Figures 2, 3:
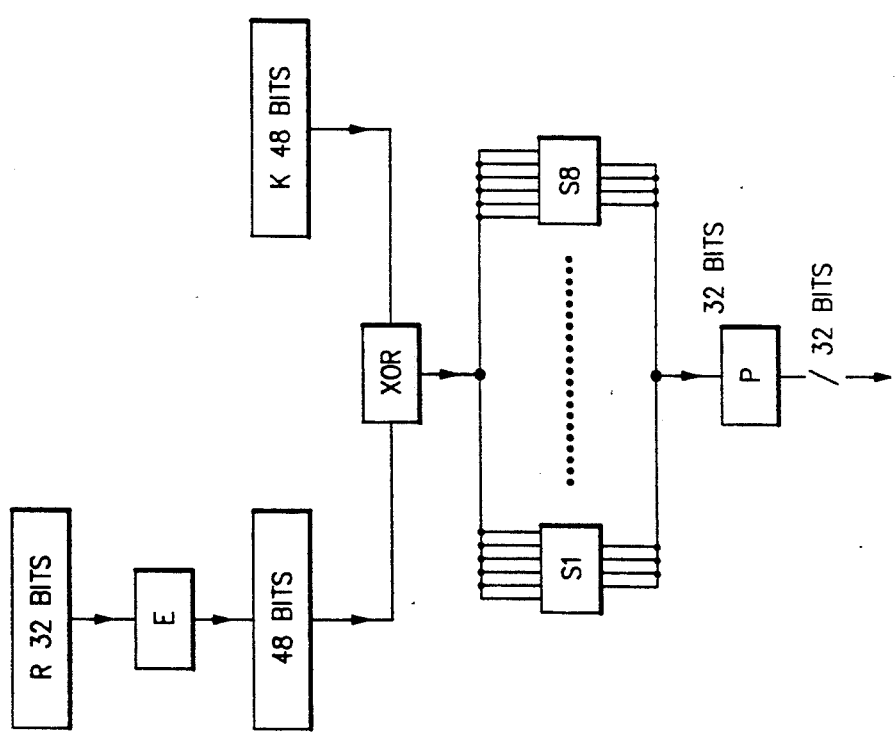
FIG. 2 shows the Standard f Function.
FIG. 3 shows the E Bit-Selection Table for expansion of the 32 bit data.

FIG. 2 on shows evaluation of function f, referenced in FIG. 1 E denotes for Expansion function which takes a block of 32 bits as inputs and yields a block of 48 bits as output, using a E bit selection table as shown in FIG. 3. Thus the first three bits of E(R) are the bits in position 32, 1 and 2 while the last bits in positions 32 and 1.

Selection functions S1, ... S8, referenced in FIG. 2 are also known as S-boxes (look-up tables). The 6 bits of each S1 through S8 are viewed as an index into one of the eight S-boxes. An S-box provides 64 entries of 4 bits each, so the results of all eight look-up operations will yield a 32 bit output block.

FIG. 4 shows Permutation function P. The outputs for the function P is chosen from the inputs using this table. Thus function P input bits 16, 7, 20 ... 4, 25 are permuted as output bits 1, 2, 3 ... 31, and 32.

As it can be seen, the logic delays contributed by the f-function and XOR in 16 rounds is quite significant, and any improvements made in this path would yield a significant performance increase.

Figure 5:
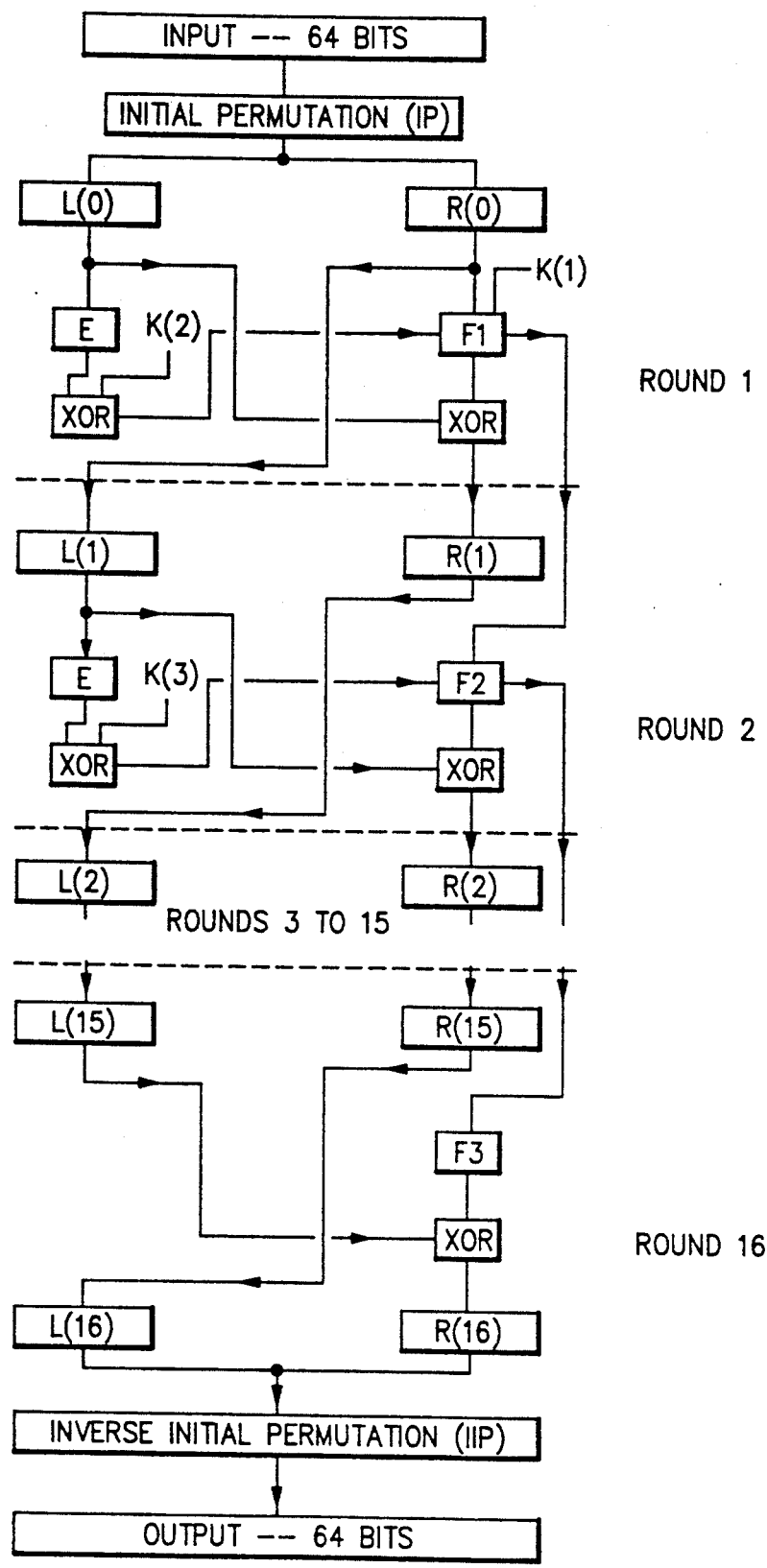
FIG. 5 shows our invention's Enhanced DES Design in our preferred embodiment.

FIG. 5 illustrates the enhanced DES design, showing the removal of one stage of XOR in all but one of the 16 occurrences of the f-function, for a total of 15 stages. The disclosed method uses three unique f-functions; f1 in round 1, f2 in rounds 2 through 15, and f3 in round 16 as shown in FIG. 5. In the implementation shown in FIG. 1, fill in the f functions according to the FIG. 2 to complete the data flow. The right half of the 64 bit input data is permuted (bit swapped), then expanded to 48 bits, XOR'd with the first 48 bit Key, then fed to an "S-BOX" that provides selected patterns in 32 bits. These 32 bits are then permuted(bit swapped), XOR'd with the left half of the 64 bit input data, and then fed to the next stage. At the start of the next stage, again the data is expanded to 48 bits, and XOR'd with the next 48 bit key. It is the order of this Expand and XOR that is modified for performance. Here we implement some parallelism to remove a stage of logic. Rather than wait for the last XOR of the previous stage to finish before we Expand and then XOR the left half input data with the Second Key, it is logically proven that if the left half of the input data is Expanded and XOR'd with the Second Key at the same time the right half of the input data is still going through its XOR, S-BOX, Permute, and Expansion, then this expanded result can be immediately XOR'd with the data coming from Expand and XOR of the left input data and Key that now happens in parallel. This data can now go directly to the S-Box of the next stage, rather than through the Expand and XOR in the beginning of the next stage, as in prior designs. This is how a stage of logic can be removed.

In FIG. 5 the $K_n$ key is pre-XOR'd with 48 bits of $L_{(n-2)}$ data for $2 \leq n \leq 15$, the result of each being used in both f1 and f2 functions, as can be seen in FIG. 6 and FIG. 7. Since the paths for $L_{n-2}$ are not timing critical, the output of this pre-XOR will be ready to be XOR'd again, with the Permuted output of each S-BOX, inside each f1 and f2 function. This result can then be sent directly to the input of the next round, therefore, one XOR gate between rounds is removed. The critical path is now changed to be the path from the initial permutation through f1, all f2s, f3, the final XOR, to the inverse initial permutation.

In FIG. 5, the result of the right half of every round is needed by the next round. In the new implementation, the "regular right half result", $P_1 \ldots P_n$ is created to satisfy the algorithm. FIG. 6 and FIG. 7 depicts this. Since the right half result is not used until the following round, $p_1 \ldots P_n$ will not be in the timing critical path.

Mathematical Proof of Compliance with DES

To prove the new structure, shown in FIG. 5 on page 5, is equivalent to the original structure, shown in FIG. 1 on page 1, the following equations are proven.

Notations:
E() denotes 32 bit to 48 bit Expansion according to a set pattern

P() denotes a swapping or Permutation of 32 bits according to a set pattern

S() denotes a Selection process by which 6 input bits yield a 4 bit output pattern according to a set of predetermined tables.

$SI_n$ denotes the expanded data that has already been XOR'd with the next stage Key.

$R_n$ denotes Right side 32 bits of input data of Round n $K_n$ denotes 48 bit current deciphered Key $L_n$ denotes Left side 32 bits of input data of Round n $SI_n$ denotes 48 bits of input data to S-BOX of Round n $P_n$ denotes 32 bits of Permuted S-BOX output data of Round n n is a set of integer denoting the current round of operation $\oplus$ means logical "exclusive or" function i.e. $0\oplus 0=0$, $1\oplus 0=1$, $0\oplus 1=1$, $1\oplus 1=0$ for $2 \leq n \leq 15$, The original $SI_n$ is $$SI_n = E(L_{(n-2)} \oplus f(R_{(n-2)}, K_{(n-1)})) \oplus K_n \quad (1)$$

By distributive law, $$= E(L_{(n-2)}) \oplus E(f(R_{(n-2)}, K_{(n-1)})) \oplus K_n \quad (2)$$

By associative law, $$= (E(L_{(n-2)}) \oplus K_n) \oplus E(f(R_{(n-2)}, K_{(n-1)})) \quad (3)$$

Eq (3) represents the structure of the new design. The new design neither alters the DES algorithm nor the DES function. Eq (3) indicates that the first two logic terms are not timing critical, therefore they can be evaluated first, removing them from the critical path.

To prove the equations are true, let's substitute:
For n=2, $$\text{ORIGINAL } SI_2 = (E(R_1) \oplus K_2)$$

$$= E(L_0 \oplus f(R_0, K_1)) \oplus K_2 \quad (4)$$

By distributive law, $$= E(L_0) \oplus E(f(R_0, K_1)) \oplus K_2 \quad (5)$$

By associative law, $$= (E(L_0) \oplus K_2) \oplus E(f(R_0, K_1)) \quad (6)$$

It can be seen that f1 function in FIG. 6, is pictorial representation of Eq (6).

This proves that Eq (1) to (3) are true for n=2. For $3 \leq n \leq 15$,

ORIGINAL $Sl_3 = (E(R_2) \oplus K_3)$ $$= E(L_1 \oplus f(R_1, K_2)) \oplus K_3 \quad (7)$$

By distributive law, $$= E(L_1) \oplus E(f(R_1, K_2)) \oplus K_3)) \quad (8)$$

By associative law, $$= (E(L_1) \oplus K_3) \oplus E(f(R_1, K_2)) \quad (9)$$

Refer to FIG. 6 when $Sl_2$ is true, $f(Sl_2) = f(R_1, K_2)$ is true also. All terms in Eq (9) have been proven in f2 function.

The f2 function is repeated for round 3 through 15. Rounds 2 through 15 are identical, therefore, rounds 2 through 15 of the enhanced design are logically equivalent to rounds 2 through 15 of the standard design.

Lastly, the f3 function is proven. The F3 function simply takes the proven input $Sl_{15}$ and applies it to the normal path for Inverse Initial Permutation. Refer to FIG. 8.

In the mathematical proof, a general equation (3) is shown and proven by evaluating numerically. Also every function, f1, f2, and f3, are proven as matched mathematical equations.

As stated earlier, the regular round result will have to be re-created, therefore:

for each $R_n$ for $1 \leq n \leq 15$, $$L_n = R_{(n-1)}$$

$$R_n = L_{(n-1)} \oplus P(S(E(R_{(n-1)}) \oplus K_n))$$

The $P(S(E(R_{n-1}) \oplus K_n))$ is just the function f, therefore the regular round outputs are recreated.

While we have described our preferred embodiment of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A data processing system for executing cryptographic functions based on DES algorithm implemented in hardware, comprising:
    a hardware Data Encryption Standard (DES) element conforming to ANSI X3.92 data encryption standards;
    said standard element having a critical path with 16 rounds utilized for data encryption processing; and
    a standard E-table; and characterized in that there is provided:
    means for removing a stage of logical XOR function of the ANSI X3.92 data encryption DES element from the critical path in rounds 2 through 15 and for decreasing the logical delays to provide higher performance;
    said critical path being identified as a 48 bit XOR function between expanded dat and key which indexes into S-boxes in the f-function of the DES algorithm; and
    said critical path for rounds 2 through 15 are restructured whereby the XOR function performed between the expanded left half of the input data and the key during the current round and this result is fed to the next round of f-function during encryption; and whereby
    the left half of the input data is pre-expanded using the standard E-table to match the size of the keys.

2. A data processing system according to claim 1 wherein round 1, $Sl_1$ is defined as, $$Sl_1 = (E(R_0) \oplus K_1)$$

3. A DES element in accordance with claim 1 wherein rounds 2 through 15 are redefined as, $Sl_n$, for $n=2$ to $15 = (E(L_{(n-2)}) \oplus \oplus K_n) \oplus E(f(R_{(n-2)}, K_{(n-1)}))$ 4. A DES element in accordance with claim 1 wherein round 16, $Sl_{16}$ is defined as, $$Sl_{16} = E(R_{15}) \oplus E(L_{14} \oplus K_{15})$$

5. A DES element in accordance with claim 2 wherein rounds 2 through 15 are redefined as, $Sl_n$, for $n=2$ to $15 = (E(L_{(n-2)}) \oplus K_n) \oplus E(f(R_{(n-2)}, K_{(n-1)}))$ 6. A DES element in accordance with claim 5 wherein round 16, $Sl_{16}$ is defined as, $$Sl_{16} = E(R_{15}) \oplus E(L_{14} \oplus K_{15})$$

* * * * *